April 28, 1931.  G. H. HUFFERD  1,803,257
TIE ROD END CONSTRUCTION
Filed Oct. 4, 1926   2 Sheets-Sheet 1
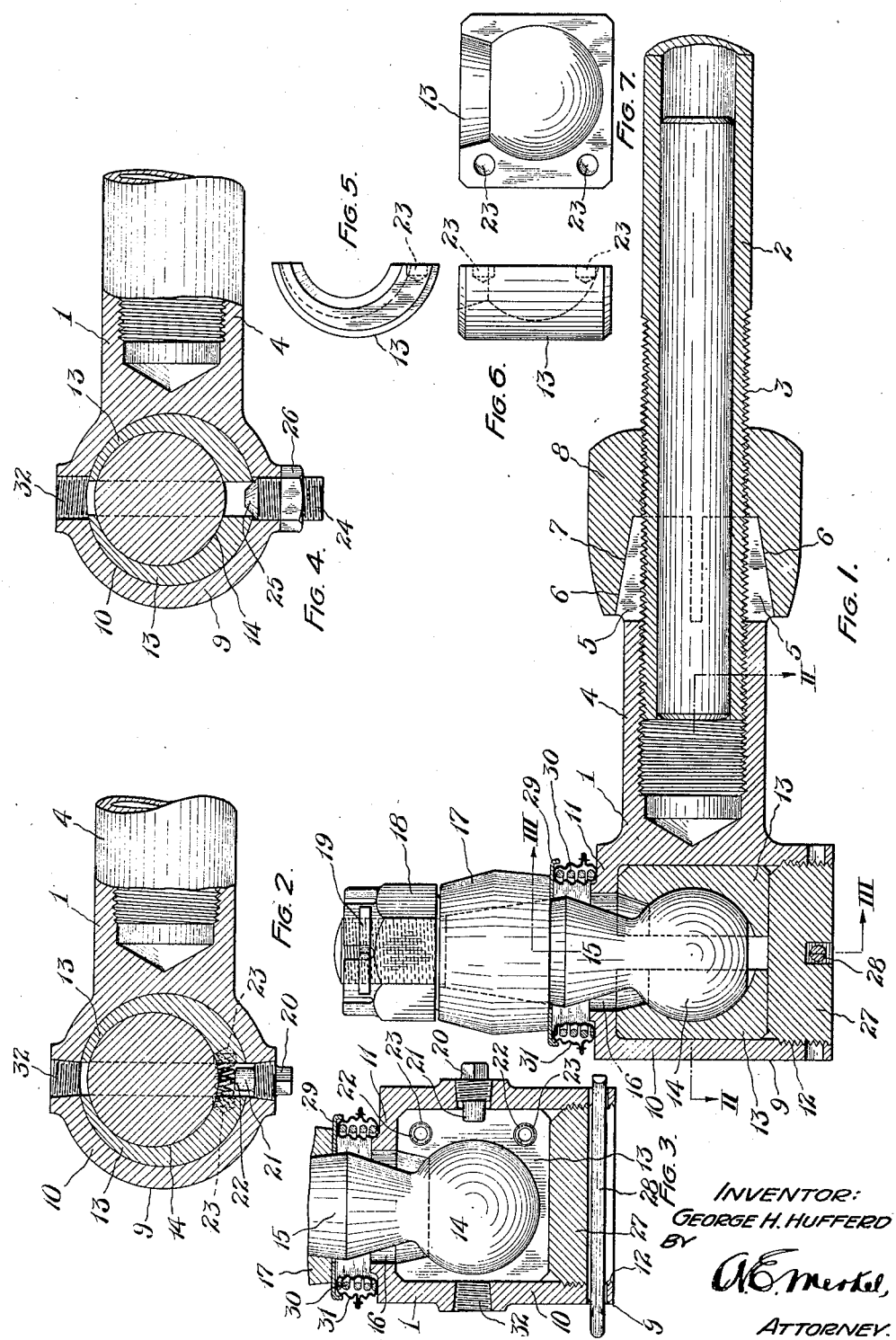
INVENTOR:
GEORGE H. HUFFERD
BY
ATTORNEY.

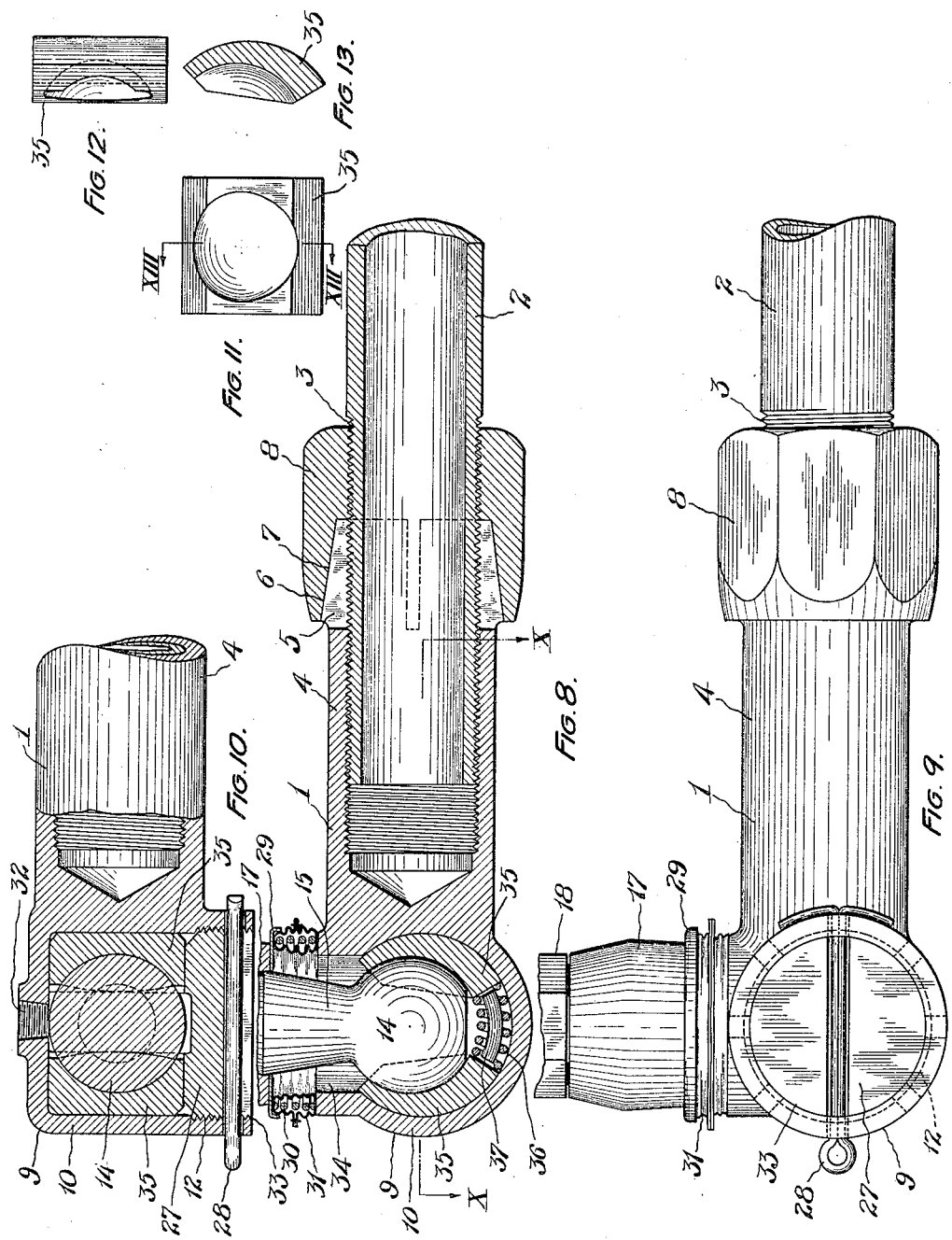

Patented Apr. 28, 1931

1,803,257

UNITED STATES PATENT OFFICE

GEORGE H. HUFFERD, OF DETROIT, MICHIGAN, ASSIGNOR TO THOMPSON PRODUCTS, INC., OF CLEVELAND, OHIO, A CORPORATION OF OHIO

TIE-ROD-END CONSTRUCTION

Application filed October 4, 1926. Serial No. 139,267.

This invention relates to constructions for the ends of tie rods such as are used in automobiles and like situations.

The tie rod or connecting rod of an automobile is that rod which connects an arm of a front steering knuckle to a like arm on the opposite side to compel turning of the front wheels in unison when one of the steering knuckles is moved by the operation of the steering wheel.

More particularly the invention relates to the coupling at the end of the tie rod member.

The general object of the invention is to provide a tie rod construction having a universal ball joint at its end which is safe, strong, and durable, easily assembled and lubricated, cheaply manufactured, and in which rattling of the joint will be prevented.

More specific objects of the invention are to locate the joint in the line of the forces present in use and in a way to provide short end clearance, and to provide a bearing which may be readily adjusted either automatically or manually to take up wear.

The invention consists, primarily, in combining with an end member provided with a socket having cylindrical walls, ball seats having cylindrically curved outer walls and segmental spherically curved inner walls eccentrically arranged and which form wedges between the socket walls and the ball of a ball stud, whereby wear in the ball joint may be taken up manually or automatically.

The invention further consists in the means hereinafter described and illustrated, as pointed out in the subjoined claims.

In the accompanying drawings illustrating two specific embodiments of the invention:

Figure 1 is a vertical longitudinal section through the improved tie rod end.

Fig. 2 is a fragmentary plan section on line II—II of Fig. 1.

Fig. 3 is a fragmentary vertical cross section on line III—III of Fig. 1.

Fig. 4 is a view similar to Fig. 2 showing means for manually adjusting the bearing shells.

Fig. 5 is a plan of one of the half bearings.

Fig. 6 is an end elevation thereof.

Fig. 7 is an inside elevation of the half bearing shown in Fig. 6.

Fig. 8 is a vertical longitudinal section of a modified form.

Fig. 9 is a side elevation of Fig. 8.

Fig. 10 is a fragmentary plan section on line X—X of Fig. 8.

Fig. 11 is an inside elevation of one of the half bearings employed in the modified form.

Fig. 12 is a plan view of the half bearing shown in Fig. 11.

Fig. 13 is a vertical section on line XIII—XIII of Fig. 11.

Referring to the drawings in detail in which the same part is designated by the same number throughout, the tie rod is composed of end members 1 (only one of which is shown) which may be cast, forged, or stamped, and an intermediate member 2. The intermediate member 2 is preferably composed of a tube, externally threaded at its outer ends, as indicated at 3, the threaded end entering an internally threaded socket 4 of the end member. The inner end of the socket 4 is preferably slotted as indicated at 5 and is provided with an outer conical surface 6 which is engaged by an interior conical surface 7 of a lock nut 8 threaded onto the end of the intermediate member. The connection just described enables adjustment between the centers of the joints at the ends of the rod to be effected in a convenient manner, but other means may be employed for this purpose.

Referring now to Figs. 1 to 7 inclusive, illustrating the form now preferred, the end member 1 is provided with a cavity or ball joint housing 9 having a wall 10 of cylindrical curvature, the axis of the cylinder, in this form, being at right angles to the axis of the rod 2. The upper end of the housing 9 is provided with an annular inwardly extending flange 11 and its lower end is internally threaded, as indicated at 12. Within the housing 9 are two ball seats 13 composed of half-shells, the outer surfaces of which are cylindrically curved to fit the wall of the housing and the inner surfaces of which are spherically curved to form bearings for the ball 14 of a ball stud, the shank 15 of which extends upwardly through the opening 16 bounded by the flange 11 and which is engaged, in bearing relation, by an arm 17 projecting from a steering knuckle or like part. The upper end of the shank 15 is threaded to receive a nut 18 to maintain the connection between the shank 15 and arm 17, a lock pin 19 being preferably employed to lock the parts securely in connected relation.

The spherically curved surface of each ball seat is eccentrically arranged with respect to the outer cylindrically curved surface, so that a central cross section taken at right angles to the axis of such outer cylindrical surface will show converging surfaces forming, in general effect, a wedge, as indicated clearly in Figs. 2, 4, and 5. The ball seats are preferably so arranged in the housing that the bases thereof are set about 90° from a horizontal plane passing through the axis of the rod 2, whereby the bearing surfaces of the ball seats are positioned in the line of thrust, which is along the axis of rod 2. To maintain the ball seats in this position, I preferably insert a plug 20 in an aperture of the housing, having an inner end 21 which enters the space between the bases of the ball seats as indicated in Fig. 2.

For the purpose of taking up wear in the ball joint I provide means, acting between the bases of the ball seats, to cause the separation thereof, and to force them in the direction of the apexes of the wedges. This means may take different forms according to the desire to provide automatic or manual adjustment. In the form shown in Figs. 2, 3 and 7, this means consists of two small expansion springs 22 having their ends seated in recesses 23 formed in the bases near their upper and lower edges. These springs are inserted under compression and therefore constantly tend to separate the bases, whereby, when the bearings become worn, they force the ball seats about the ball of the joint and wedge them into snug contact therewith.

Instead of providing automatic adjustment as just described, the ball seats may be manually adjusted. Fig. 4 discloses suitable means for effecting such adjustment. In the form shown a plug 24 is screw-threaded into an aperture of the housing which has a conical inner end 25 engaging the opposed bases of the wedging ball seats. A lock nut 26 engages the exterior threads of the plug 24 and seats against the outer surface of the housing. When the joint becomes loose from wear, the plug is turned to project it inwardly, the camming action of the conical inner end of the plug forcing a further separation of the oppositely disposed portions of the bases of the ball seats, and effecting a snug contact with the ball of the ball stud. In this form the plug 24 acts both as an adjusting means and a retaining means to keep the ball seats in the proper relative position.

The housing cavity at the lower end is closed by an externally threaded plug 27 engaged with the internal threads 12 at the lower end of the cavity, which is set up against the ball seats 13, and held in position in any suitable way, as by a cotter pin 28, passing through apertures in the housing and a slot in the outer end of the plug.

For the purpose of preventing the entrance of dirt and dust into the ball joint, it is desirable to employ a dust cap 29 seated against the arm 17 and interposed between which and the housing is a coil spring 30 preferably enclosed by a flexible casing 31.

The housing is preferably provided with a lubricating aperture 32.

In assembling the parts, the ball seats 13 are engaged with the ball of the ball stud, and while the parts are so held together and with the plug 27 removed from the end of the housing, the shank is projected upwardly through the opening in the upper end of the housing until the ball seats contact with the flange 11. This procedure is necessary because the opening bounded by flange 11 is of less diameter than the ball of the ball stud. After insertion of the ball stud and ball seats the plug 27 is screwed into place and secured.

As above indicated, when it is desired to adjust the distance between centers of the ball studs it is necessary to loosen the lock nut 8, relatively rotate the intermediate and end members 1 and 2 and again set the lock nut.

In the form of the invention illustrated in Figs. 8 to 13 inclusive, the cylindrical surface forming the wall of the housing in the end member 1 has its axis at right angles to that shown in Figs. 1 to 7, and, in use, lies in a horizontal plane instead of a vertical plane, and the open end 33 of the housing is at the side of the member 1, instead of the bottom, as shown in the preferred form. An opening 34 intersects, at right angles, the cavity forming the housing, and is of a size to admit the ball 14 of the ball stud. In this embodiment the ball seats are of somewhat different form from that above described, but the wedging feature above described is retained and they operate in the same way and for the performance of the same function as in the preferred form. However, in view of the fact that, in assembling the parts, the ball must pass through the opening 34 in the upper side of the end member and that the joint is therefore liable to disconnection, provision has been made for such an emergency, as will now be described.

The ball seats 35 are of such dimensions that, when inserted in the housing through the side opening 33 with their thicker edges or bases in contact, the ball 14 may be inserted through opening 34 to seat against the bearing surfaces of the ball seats. Thereafter the said bases of the ball seats are separated, forcing the thinner edges of the ball seats about the ball and into the path of the outer surface of the ball. In order to maintain them in this locking position, one or more expansion springs 36 are interposed between the bases, these springs also acting constantly to keep the bearing surfaces in snug contact, as in the preferred form. If such springs were alone employed and should become broken, there would be likelihood of the parts of the joint becoming disconnected. For this reason I employ a rigid separating and limiting member 37, preferably enclosed by the coils of the spring 36. With such limiting means it would be impossible for the ball seats 35 to move into contact or into position to permit the escape of the ball 14 even should the springs 36 break.

While I have set forth specific embodiments of my invention, it is to be understood that such embodiments are merely exemplary of the principles involved in my invention, and that my invention is not to be confined to the details shown but includes all changes and modifications falling within the terms of the appended claims.

What I claim is:

1. A rod coupling comprising, in combination, a member provided with a ball joint housing at its outer end having a wall of cylindrical curvature, ball seats in said housing having outer walls conforming to the curvature of the housing walls and being loosely mounted therein and inner segmental spherical bearing surfaces eccentric with respect to the outer surfaces so as to be of general wedge shape in cross section and whose bases are separated, a ball stud having its ball seated in the ball seats, and means for separating the bases of the ball seats and forcing them in the direction of the apexes of the wedges to take up wear in the joint.

2. The combination specified in claim 1 in which the means for separating the bases of the ball seats comprises springs interposed between the bases to constantly force them apart.

3. The combination specified in claim 1 in which the means for separating the bases of the ball seats comprises springs interposed between the bases to constantly force them apart, and with additional rigid means to prevent engagement of such bases.

4. A ball seat for a rod coupling having an outer cylindrically curved surface and an inner spherically curved surface eccentrically arranged with respect to the outer surface, whereby a central section taken at right angles to the axis of the outer cylindrical surface will show converging surfaces in the nature of a wedge.

5. A rod coupling, comprising in combination a member provided with a ball joint housing at one end having a wall of cylindrical curvature, ball seats in said housing having outer walls conforming to the curvature of the housing walls and being loosely mounted therein and inner segmental spherical bearing surfaces eccentric with respect to the outer surfaces so as to be of general wedge shape in cross section and whose bases are separated, a ball stud having its ball seated in the ball seats, and means positioned in the wall of the housing adapted to maintain the bases of the ball seats in separated relationship at a predetermined position in the housing.

6. In a ball joint, a ball of a ball stud, a housing having an inner cylindrical surface, separated seat members of wedge-like cross section having inner spherical surfaces for engaging said ball and outer cylindrical surfaces conforming with the inner cylindrical surface of the housing and means urging apart the oppositely disposed bases of said seat members.

7. In a ball joint, a spherical member, separated seat members engaging said spherical member and having spherical inner surfaces and cylindrical outer surfaces, the center of curvature of the spherical surfaces being offset from the axis of the cylindrical surfaces, a housing having inner cylindrical surfaces conforming to and in contact with said first mentioned cylindrical surfaces and means for urging said seat members into wedging engagement with the respective contacting surfaces of said spherical member and housing.

8. In a ball joint, a spherical member, separably movable wedge-like seat members disposed in spaced relation about said spherical member, a housing and means constantly urging said seat members into contact with said spherical member and said housing.

9. A tie rod coupling for automotive vehicles, comprising a ball stud having a substantially spherical ball, a housing for said ball having a cylindrical inner surface, means for wedgingly engaging said ball including members having segmental spherical inner surfaces to contact with the spherical surface of said ball and having cylindrical outer surfaces in slidable contact with the cylindrical inner surface of said housing, said members being circumferentially spaced about said ball to provide gaps therebetween on opposite sides of the ball, and resilient means automatically urging said members into wedging engagement with said ball to take up wear between the respective contacting spherical surfaces.

10. A tie rod coupling for automotive vehicles, comprising a ball stud having a spherical ball, a housing for said ball having a cylindrical inner surface, members movably disposed between said ball and cylindrical inner surface and presenting segmental spherical inner surfaces in contact with the spherical surface of said ball and cylindrical outer surfaces in contact with said cylindrical inner housing surface, said members being circumferentially spaced about said ball and presenting wedge-like shapes in section, and resilient means automatically urging said members in the direction of the thinner tapered ends thereof to cause closer contact between said spherical surfaces of said members and ball respectively and thereby take up wear.

11. In a ball joint, a housing, a spherical member, a plurality of seat members independently movable relative to each other and having convergingly related inner and outer faces for causing said seat members to wedgingly engage said spherical member and said housing, and means constantly urging said seat members into said wedging engagement.

12. In a ball joint, a spherical member, a housing therefor having a non-spherical inner surface, independently movable members disposed about said spherical member and having inner and outer surfaces conforming to the surfaces of the spherical member and housing respectively, said movable members presenting wedge-like shapes in section and resilient means urging said movable members into wedging engagement with said spherical member and said housing.

Signed by me this 1st day of October, 1926.

GEORGE H. HUFFERD.